United States Patent [19]
Rodriguez-Flores et al.

[11] Patent Number: 5,468,500
[45] Date of Patent: Nov. 21, 1995

[54] SOURSOP FLAVOR

[75] Inventors: Manuel Rodriguez-Flores, Mayagüez; Sonia Rivera-Gonzalez, San Sebastián, both of Puerto Rico

[73] Assignee: University of Puerto Rico, San Juan, Puerto Rico

[21] Appl. No.: 145,279

[22] Filed: Oct. 29, 1993

[51] Int. Cl.$^6$ .......................... A61K 35/78; A61K 47/14; A23L 1/222; A23L 2/02
[52] U.S. Cl. .......................... 424/441; 424/435; 424/439; 424/440; 424/195.1; 426/533; 426/534; 426/590; 426/599; 426/615; 426/650; 426/660; 514/784; 514/785; 514/974; 514/948
[58] Field of Search ..................................... 514/784, 974, 514/948, 785, 195.1; 426/534, 533, 590, 599, 615, 650, 660; 424/435, 439, 440, 441

[56] References Cited

U.S. PATENT DOCUMENTS

| | | | |
|---|---|---|---|
| 4,499,114 | 2/1985 | Luccarelli, Jr. et al. | 426/534 |
| 4,539,209 | 9/1995 | Wilson et al. | 426/3 |

OTHER PUBLICATIONS

Benk Sussiwaren Tech Wirtsch 30(3):83–84 (1986).
Horos et al. Die Industrielle Obst und Gemuseverwertung 63(17):459–461 (1978).
Wong et al. Flavour and Fragrance Journal 8(1):5–10 (1993) (Accepted 10 Aug. 1992).
Franco et al. I Brazil Ciene Technol Aliment 3(2):117–128 (1983).
Natarajan Can. Inst. Food Sci. Technol. J. 6(4):248–249 (1973).
Franco et al. II J. Sci. Food Agric. 34(3):293–299 (1983).
Escarraman et al. Technol Aliment 17(6):3–4 (1982).
Gromek et al. Phyto Chemical Analysis 5(3):133–140 (1994).
MacLeod, A. J. and Pieris, N. M., Volatile Flavor Components of Soursop (Annona muricata), J. Agric. Food Chem. 29:488–490, 1981.
Rivera Gonzalez, S., Estudio de los Componentes Responsables del Olor y el Sabor en Seis Selecciones (Clones) de la Guanabana (Annona muricata .L), University of Puerto Rico, Mayaguez, granted in May 1991, and placed in library on Oct. 29, 1992.

*Primary Examiner*—Shep K. Rose
*Attorney, Agent, or Firm*—Olive & Olive

[57] ABSTRACT

A natural tasting soursop flavoring composition prepared by combining methyl butanoate, methyl 2-butenoate, butanoic acid, methyl hexanoate, methyl 2-hexenoate, hexanoic acid and linalool.

16 Claims, No Drawings

SOURSOP FLAVOR

BACKGROUND OF THE INVENTION

1. Field of the Invention

This invention relates to flavorings, and in particular, relates to fruit flavoring agents.

2. Description of the Related Art

The present invention relates to a new flavoring agent capable of imparting to diverse foodstuffs the taste and aroma of soursop (*Annona muricata L.*). Specifically, the invention relates to the discovery that the soursop flavor is imparted by a mixture of four methyl esters, two organic acids and linalool, said mixture containing these compounds in certain specific proportions. Numerous food flavorings simulating the taste, and sometimes, the aroma, of various products and natural foodstuffs have been developed, including various synthetic fruit flavors. Thus, the patent of Wilson et al. (U.S. Pat. No. 4,539,209) describes the use of hexynyl alkanoates to provide a tropical fruit or coconut flavors among others. Luccarelli, Jr. et al. (U.S. Pat. No. 4,499,114) uses a mixture of $C_4$-$C_{10}$-N-alkanoic acids with the ethyl ester of 2-hydroxy-4-methyl-pentanoic acid to yield a fruit flavor. The disclosure of all patents and publications cited herein are incorporated herein by reference.

The flavor and aroma components of soursop have received little attention. However, MacLeod and Pieris (MacLeod, A. J. and Pieris, N. M., J. Agric. Food Chem. 29:488–490, 1981) obtained and analyzed samples of soursop with the purpose of identifying the aroma components. Of the 44 components which they found, they identified 24, and they concluded that most aroma components were esters. Methyl hexanoate and methyl 2-hexenoate were the two most abundant components.

Fruits such as soursop go through a series of developmental stages as the fruits ripen. Each of these stages is characterized by a different flavor due to a different combination of flavor components. Certain components may be present at one stage in a high concentration and be absent or at a very low concentration at another stage. Generally, there is only a short time period when each fruit has the optimum taste for the average consumer. Thus, in the flavor and aroma technology industry, the proportion of the different components utilized is nearly as important in expressing a chosen flavor as is the actual selection of the components. Previous researchers have not determined the components of soursop which cause the flavor to be the preferred, optimal flavor.

Initial research on the identification of soursop components is described in the M.S. thesis of Sonia Rivera Gonzalez, which is on deposit in the General Library of the University of Puerto Rico, Mayagüez, the disclosure of which is incorporated herein.

It is therefore an object of this invention to provide a new flavoring composition which, when incorporated into foodstuffs and pharmaceuticals alike, will impart a pleasant, natural soursop flavor.

Other objects and advantages will be more fully apparent from the following disclosure and appended claims.

SUMMARY OF THE INVENTION

The natural tasting soursop flavoring composition of the invention is preferably prepared by combining methyl butanoate, methyl 2-butenoate, methyl hexanoate, and methyl 2-hexenoate. In the more preferred embodiments, the first three or all five of the components, butanoic acid, hexanoic acid, linalool [3,7-dimethyl-1,6-octadien-3-ol], methyl nicotinate and methyl cinnamate are added to the mixture. It is important for the final soursop flavor that in preparing each of the embodiments of the invention the concentration of methyl 2-hexenoate is greater than that of any of the other components.

Although the fullness and richness of natural soursop is achieved by using these optimum proportions, it is possible to effect minor variations in the percentages of the four major components (for example, ±5% of each of them), without significantly affecting the quality of the flavor.

The compounds constituting the first two embodiments of this invention is soluble in water or aqueous media at the concentration needed to reproduce the actual flavor of the fresh fruit. This concentration may be increased up to 0.33% v/v if necessary. Higher concentrations can be obtained by using ethanol or ethanol-water mixtures as solvents. This makes the invention suitable for food preparations such as candies, dry beverage powders; semi-moist systems such as fruit-flavored yogurt, ice cream, ice milk, sherbets, syrups, jams, jellied, gelatins, puddings, pie filling, and liquid preparations such as fruit-flavored beverages (carbonated, non-carbonated and alcoholic beverages such as "schnapps", "breezers" and liqueurs) and the like. This invention may also be incorporated into pharmaceutical products, for example: in its dry form it may be used in tablets used in chewable vitamins or lozenges, so as to impart a pleasant taste and to mask any unpleasant aftertaste due to the medicine itself.

Another important application of the invention is used to enhance the flavor of soursop nectars and juices prepared from fresh pulp to improve and standardize the taste of these products and to extend their shelf-life.

Other aspects and features of the invention will be more fully apparent from the following disclosure and appended claims.

DETAILED DESCRIPTION OF THE INVENTION AND PREFERRED EMBODIMENTS THEREOF

Initial stages of his research utilized soursop fruits obtained over the course of several months as the fruit ripened, and studies different selections of soursop trees. As a result of this research, a determination was made of the selection of fruits and the stage of maturation which correspond to a selected optimum flavor and aroma of soursop.

In the first embodiment of the invention, methyl butanoate, methyl 2-butenoate, butanoic acid, methyl hexanoate, and methyl 2-hexenoate are the main natural flavor constituents of the soursop. When these selected flavor constituents are combined in their naturally-occurring ratios at the selected maturation stage, a soursop flavor and aroma is obtained. This requires that the concentration of methyl 2-hexenoate be the highest of the flavor components.

In a second, more preferred embodiment of the flavor mixture of the invention, hexanoic acid and linalool (3,7-dimethyl-1,6-octadien-3-ol) are also added. In a third, most preferred embodiment of the invention, these two additional components are added to the mixture along with methyl nicotinate and methyl cinnamate.

In particular, in the second preferred embodiment of the soursop flavoring composition of the invention, the following substances (all liquids at room temperature) are combined in the indicated proportions (stated as percentages by volume, excluding the solvent): methyl butanoate (9.4%), methyl 2-butenoate (11.7%), butanoic acid (7.0%), methyl hexanoate (26.9%), methyl 2-hexenoate (42.4%), hexanoic acid (2.3%), and linalool [3,7-dimethyl-1,6-octadien-3-ol] (0.5%). For example, if 3.0 ml of this mixture is added to 1,000 ml of water at room temperature, a 0.3% by volume (% v/v) solution of the flavoring composition in water is obtained. The proportions by weight are very similar, since these compounds have densities at room temperature which are very close to 1.0 gram/ml. Therefore, to prepare a 0.3% solution by weight, 3.0 g of the flavoring mixture is added to 1,000 g of water (approximately 1 liter). The flavoring mixture itself could also be prepared by using the stated percentages by weight instead of by volume without significantly altering its composition. Percentages of the other two embodiments of the invention are discussed in more detail in the Examples.

As it is well known that the actual flavors of soursop are variable depending on the maturation state and plant, it is clear that the percentages of the compounds may be varied without departing from the general flavor of soursop, and in fact, changes in the order of plus or minus 10 or 15% may be effected without being detectable by the untrained palate. According the invention the primary requirement is that the ratio of methyl 2-hexenoate to methyl hexanoate be about 1.6. This is particularly important in the first embodiment where there are only four flavoring components.

It is also understood that the flavoring composition of the invention may be supplemented to prepare particular products. For example, to prepare a soft drink, besides a sweetening agent, acids would need to be added as are known in the art. For example, with soursop, malic and citric acids, which occur in fruit would be appropriately added.

Since expression of the soursop flavor does not require any type of interaction between the components of the flavor composition or fixation of a particular one to any of the others, the desired soursop flavor may be obtained by adding the components concurrently or sequentially to the particular food, beverage, or pharmaceutical preparation. When the components of this invention are to be utilized in dry form for incorporation into dry solid preparations, or where fixation of these components is generally desired, this may be accomplished by any method known in the art to effect the desired result without at the same time causing degradation of any component.

The invention will now be described by reference to the following operative examples.

The features and advantages of the present invention will be more clearly understood by reference to the following examples, which are not to be construed as limiting the invention.

EXAMPLES

EXAMPLE I

Soursop Extraction

Five hundred grams of soursop pulp (*Annona muricata L.*) were obtained from the Fortuna Agricultural Experiment Substation at Juana Diaz, Puerto Rico. The pulp was mixed with 300 ml of diethyl ether and centrifuged to 1800 rps at 22° C. for 10 minutes. The resultant slurry was decanted. Using a separatory funnel the organic phase was separated from the aqueous phase. Sodium sulphate (anhydrous) was added to the organic phase to remove water traces, and filtered to remove any solid particles from the sample. This solution was evaporated under vacuum at 10° C. with a rotatory evaporator. As a final step, the volume of the extract was reduced to 0.2 ml using a gentle stream of ultra pure dry nitrogen.

Three extracts (some from the combined pulp of several fruits) from each of six lines of soursop were prepared (except for two of them, from which only two were obtained) for a total of 16 extracts. Each extract was then analyzed in duplicate; thus, a total of 32 analyses of soursop volatiles were performed.

Separation and Identification

Separation of the concentrated extract into its components was accomplished by capillary gas chromatography (GC) using a Hewlett-Packard model 5790A gas chromatograph with flame ionization detector using a 60'×0.25 mm O. D. column (SPB-5) from Supelco. The column was temperature programmed from 35° C. for 8 min followed by an increase of 3° C./min to 225° C. for 18 min. The column effluent was passed through an interphase maintained at 250° C. into the ion source of a Hewlett-Packard model 5970B mass spectrometric detector. Mass spectra were obtained at 70 eV and a source temperature of 200° C., Identification of the components was accomplished by comparison of their mass spectra with mass spectra in a mass spectral library in the National Bureau of Standards (NBS) mass spectral library supplied by the Hewlett-Packard Company with the Hewlett-Packard model 9816 work station, and with those of known standard compounds which were obtained under the same conditions employed to analyze the soursop extracts. The compounds utilized to corroborate the identity of the compounds in soursop included methyl 2-butenoate, methyl hexanoate, methyl octanoate, methyl butanoate, ethyl butanoate, ethyl hexanoate, and ethyl pentanoate, methyl nicotinate, hexanoic acid, crotonic acid, butyric acid, methyl crotonate, methyl cinnamate, and 3,7-dimethyl-1,6-octadien-3-ol.

Of the 24 components previously identified by MacLeod et al. (supra), only 9 were found using the separation and analysis method described above.

A total of 32 compounds were identified in the soursop samples studied herein. The following twelve components were found in all of the samples studied: methyl butanoate; 3-hydroxy-methyl butanoate; methyl hexanoate; methyl 3-hexenoate; methyl 2-hexenoate; 5-ethyldihydro-2-(3H)-furanone; methyl nicotinate; methyl 2-octenoate; 2,3-dihydrobenzofuranone; methyl-3-phenyl-2-propenoate; hexanoic acid; and dimethyl hexanodioate. The additional 20 compounds were found in some but not all soursop samples studied.

The composition of the two extracts which possessed the most characteristic flavor and aroma of fresh soursop is shown in Tables 1 and 2.

TABLE 1

Relative Concentration of components of soursop extract No. VII-14.

| Component | Relative concentration (ng/μl) |
|---|---|
| 1. Methyl butanoate | 7540 |
| 2. Methyl 2-butenoate | 11778 |
| 3. Ethyl butanoate | 642 |
| 4. Methyl hexanoate | 18674 |
| 5. Methyl 2-hexenoate | 29155 |
| 6. Ethyl hexanoate | 921 |

TABLE 1-continued

Relative Concentration of components of soursop extract No. VII-14.

| Component | Relative concentration (ng/µl) |
| --- | --- |
| 7. Hexanoic acid | 30759 |
| 8. Methyl nicotinate | 3345 |
| 9. methyl-3-phenyl-2-propenoate | 49 |

TABLE 2

Relative Concentration of components of soursop extract No. IV-3.

| Component | Relative concentration (ng/µl) |
| --- | --- |
| 1. Methyl butanoate | 5100 |
| 2. Methyl 2-butenoate | 6913 |
| 3. Butanoic acid | 4152 |
| 4. Methyl hexanoate | 14633 |
| 5. Methyl 2-hexenoate | 23229 |
| 6. Hexanoic acid | 1393 |
| 7. 3,7-dimethyl-1,6-octadien-3-ol | 233 |
| 8. Methyl nicotinate | 1700 |
| 9. methyl-3-phenyl-2-propenoate | 127 |

EXAMPLE II

Preparation of Soursop Flavoring

A first soursop flavoring mixture was prepared containing only the four major components (percentages are expressed relative percentages in the flavoring mixture in the three examples given): methyl butanoate (10.4%), methyl 2-butenoate (13.0%), methyl hexanoate (29.9%), methyl 2-hexenoate (46.8%). Once the mixture components are measured in these proportions, they are either diluted in water or in ethanol-water to produce solutions of different concentrations as described herein. This mixture can easily be recognized as having the flavor of soursop, but is inferior in richness and fullness of the natural soursop flavor when compared with the second and third mixtures.

A second soursop flavoring mixture was prepared by combining methyl butanoate (9.4%), methyl 2-butenoate (11.7%), butanoic acid (7.0%), methyl hexanoate (26.9%), methyl 2-hexenoate (42.2%), hexanoic acid (2.3%) and linalool [3,7 -dimethyl-1,6-octadien-3-ol] (0.5%). This mixture has the fullness and richness of the natural soursop.

A third soursop flavoring mixture was prepared by combining methyl butanoate (9.2%), methyl 2-butenoate (11.5%), butanoic acid (7.5%), methyl hexanoate (25.7%), methyl 2-hexenoate (43.3%), hexanoic acid (2.3%), linalool [3,7-dimethyl-1,6 -octadien-3-ol] (0.4%), methyl nicotinate (0.05%), and methyl cinnamate (0.02%) (percentages are expressed in weights because the latter two compounds are solids). This mixture is the closest of the three mixtures to the natural flavor and aroma of soursop.

The appropriate amounts of the corresponding compounds of the first and second soursop flavoring mixtures may be dissolved in water to produce an aqueous solution up to 0.33% based on the total volume of the compounds in relation to the volume of water used. The third flavoring mixture cannot be directly prepared in water because the two solid compounds are insoluble in water but soluble in pure ethanol or in ethanol-water solutions.

Additional mixtures having variations in the percentages of the components of the second mixture were prepared and evaluated. The results show that mixtures having the two most abundant components (methyl hexanoate and methyl 2-hexenoate) with the proportion inverted with respect to that stated in the invention do not have the proper flavor and aroma of soursop. In other words, it is critical to have the percentage of methyl 2-hexenoate in the flavoring mixture be substantially greater than that of methyl hexanoate, so that the ratio of methyl 2-hexenoate to methyl hexanoate in the flavoring mixtures is in the range of about 1.6.

EXAMPLE III

Solubility in Alcohol

All of the components of the mixture of the invention are soluble in alcohol (ethanol) or alcohol-water mixtures, including the two components which are solids (methyl nicotinate and methyl cinnamate). A solution having a concentration of 30% of the artificial soursop flavor composition may be prepared using a mixture of 80% ethanol and 20% water. Further dilution to 40% ethanol also is possible without insolubilizing any of the components. Solutions of 40% ethanol correspond to the alcoholic content of regular rums and whiskeys, but some alcoholic beverages have an alcoholic content of 75.5% ethanol. In using the formulation to prepare a non-alcoholic beverage, the 40% solution may be diluted further with water as is done with other flavorings (anise, vanilla, and other commercial artificial flavorings).

EXAMPLE IV

Preparation of Soursop-flavored Ice Cream

A typical ice cream formula employing the present invention was prepared as follows:

2 whole eggs

2 ½ cups of evaporated milk (diluted 1:1 with water)

¼ teaspoon of salt

½ cup of sugar 2 tablespoons of cornstarch 4.5 ml of the artificial soursop flavoring at 0.33% by volume in water as described in Example II (second mixture) was added to one cup of this ice cream mixture. The resulting ice cream has the taste of that prepared with the fresh fruit.

A similar formula was prepared except that the mixture contained only the four major components (methyl butanoate, methyl 2-butenoate, methyl hexanoate and methyl 2-hexenoate). A satisfactory soursop flavor could be perceived.

EXAMPLE V

Preparation of Cream of Cornstarch

A typical cream of cornstarch formula employing the present invention was as follows:

1 tablespoon of cornstarch

¾ cup of milk

½ cup of water 1 tablespoon of sugar 10.0 ml of the artificial soursop flavoring composition at 0.33% by volume in water as described in Example II (second mixture) was added to this mixture. The cream of cornstarch has the taste of that prepared with the fresh fruit.

EXAMPLE VI

Preparation of Alcoholic Beverage

A typical alcoholic beverage formula employing the present invention is as follows:

116 ml of distilled water 50 g of sugar 64 ml of pure alcohol (ethanol) containing 0.10% by volume of any of the artificial soursop flavoring compositions of Example II.

The resulting alcoholic beverage has the taste of that prepared with the fresh soursop fruit.

EXAMPLE VII

Preparation of Another Alcoholic Beverage

Another typical alcoholic beverage formula employing the invention is as follows:

100 ml of distilled water 50 g of sugar 80 ml of ethanol-water (4:1 per volume) containing 0.10% by volume of any of the artificial soursop flavoring compositions of Example II.

The resulting alcoholic beverage has the taste of that prepared with the fresh soursop fruit.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. An imitation soursop flavoring composition comprising a mixture of about 9.2–10.4% methyl butanoate, about 11.5–13% methyl 2-butenoate, about 7.0–7.5% butanoic acid, about 25.7–29.9% methyl hexanoate, about 42.2–46.8% methyl 2-hexenoate, about 2.3% hexanoic acid and about 0.4– 0.5% 3,7-dimethyl-1,6-octadien-3-ol, said mixture in a solution at a concentration needed to enhance flavor of soursop nectars and juices; to impart a soursop pulp flavor to a product including soursop flavored candies, dry beverage powders, yogurt, ice cream, ice milk, sherbets, syrups, jams, jellies, gelatins, puddings, pie fillings, carbonated, non-carbonated and alcoholic beverages, and liqueurs, and to impart a pleasant taste as well as to mask any unpleasant aftertaste in pharmaceutical preparations including chewable tablets and lozenges.

2. The composition of claim 1, wherein the solution is an aqueous solution.

3. The composition of claim 2, wherein the concentration of said mixture in said solution is 0.33%.

4. The composition of claim 1, wherein the solution is an ethanol solution.

5. The composition of claim 1, wherein the solution is an ethanol-water solution.

6. The composition of claim 5, wherein the percentage of ethanol in the ethanol-water solution on a volume basis is selected from the group consisting of any percentage from 40% to 80 %.

7. The composition of claim 1, further comprising methyl nicotinate and methyl cinnamate.

8. An imitation soursop flavoring composition comprising a mixture of about 10.4% methyl butanoate, about 13% methyl 2-butenoate, about 29.9% methyl hexanoate, and about 46.8% methyl 2-hexenoate, said mixture in a solution at a concentration needed to enhance flavor of soursop nectars and juices; to impart a soursop pulp flavor to a product including soursop flavored candies, dry beverage powders, yogurt, ice cream, ice milk, sherbets, syrups, jams, jellies, gelatins, puddings, pie fillings, carbonated, non-carbonated, and alcoholic beverages, and liqueurs, and to impart a pleasant taste as well as to mask any unpleasant aftertaste in pharmaceutical preparations including chewable tablets and lozenges.

9. The composition of claim 8, wherein the solution is an aqueous solution.

10. The composition of claim 8, wherein the concentration of said mixture in said solution is 0.33%.

11. The composition of claim 8, wherein the solution is an ethanol solution.

12. The composition of claim 8, wherein the solution is an ethanol-water solution.

13. The composition of claim 12, wherein the percentage of ethanol in the ethanol-water solution on a volume basis is selected from the group consisting of any percentage from 40% to 80%.

14. The composition of claim 8, further comprising methyl nicotinate and methyl cinnamate.

15. The composition of claim 1, wherein the mixture comprises about 9.2–9.4% methyl butanoate, about 11.5–11.7% methyl 2-butenoate, about 7.0–7.5% butanoic acid, about 25.7–26.9% methyl hexanoate, about 42.2–43.3% methyl 2-hexenoate, about 2.3% hexanoic acid and about 0.4–0.5% 3,7-dimethyl-1,6 -octadien-3-ol.

16. The composition of claim 15, further comprising about 0.05% methyl nicotinate and about 0.02% methyl cinnamate.

* * * * *